United States Patent [19]
Kita

[11] Patent Number: 6,040,256
[45] Date of Patent: *Mar. 21, 2000

[54] METHOD FOR PRODUCING A REACTION SINTERED CERAMIC

[75] Inventor: Hideki Kita, Fujisawa, Japan

[73] Assignee: Isuzu Ceramics Research Institute Co., Ltd., Fujisawa, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/787,995

[22] Filed: Jan. 23, 1997

Related U.S. Application Data

[63] Continuation of application No. 08/787,995, Jan. 23, 1997, abandoned, which is a continuation of application No. 08/498,304, Jul. 3, 1995, abandoned, which is a continuation of application No. 08/321,776, Oct. 12, 1994, abandoned.

[30] Foreign Application Priority Data

| Oct. 12, 1993 | [JP] | Japan | 5-278959 |
| Feb. 8, 1994 | [JP] | Japan | 6-035500 |
| Mar. 31, 1994 | [JP] | Japan | 6-085410 |

[51] Int. Cl.⁷ ................................. C04B 35/58
[52] U.S. Cl. ............. 501/97.1; 501/97.2; 501/98.1; 427/419.7
[58] Field of Search ................. 501/98.1, 98.2, 501/98.3, 97.1, 97.2, 97.4; 427/419.7

[56] References Cited

U.S. PATENT DOCUMENTS

| 3,991,166 | 11/1976 | Jack et al. | 501/98.1 |
| 4,184,884 | 1/1980 | Jong | 501/98.1 |
| 4,547,470 | 10/1985 | Tanase et al. | 501/98.3 |
| 4,552,711 | 11/1985 | Raj et al. | 501/98.2 |
| 4,605,633 | 8/1986 | De Angelis | 501/87 |
| 4,804,644 | 2/1989 | Anseau et al. | 501/105 |
| 4,818,635 | 4/1989 | Elkstrom et al. | 501/98.1 |
| 4,866,013 | 9/1989 | Anseau et al. | 501/97 |
| 4,876,227 | 10/1989 | De Angelis | 501/96.3 |
| 4,946,630 | 8/1990 | Ezis | 501/97.2 |

(List continued on next page.)

FOREIGN PATENT DOCUMENTS

| 0242968 | 10/1987 | European Pat. Off. . | |
| 317980 | 11/1988 | European Pat. Off. . | |
| 0399750 | 11/1999 | European Pat. Off. . | |
| 3414979 | 10/1984 | Germany | 501/98.1 |
| 9146982 | 8/1984 | Japan | 501/98.1 |
| 1219762 | 9/1986 | Japan . | |
| 1266357 | 11/1986 | Japan . | |
| 3129072 | 1/1988 | Japan . | |
| 3186076 | 1/1988 | Japan . | |
| 3038864 | 12/1988 | Japan . | |
| 401072909 | 3/1989 | Japan . | |
| 1115807 | 5/1989 | Japan . | |
| 3097674 | 4/1991 | Japan . | |
| 4351297 | 12/1992 | Japan . | |
| 2155007 | 9/1985 | United Kingdom | 501/98.1 |
| 8809778 | 12/1988 | WIPO . | |

OTHER PUBLICATIONS

"Ceramic Matrix Composites via in–situ Reaction Sintering" Jones et al. Br. Ceram Proc. (1994), 53 (Novel Synthesis & Processing of Ceramics), p. 221–32.

"Titanium Nitride (TIN)/Sialon Composites via in–situ Reaction Sintering" Hong et al. Cent Adv Mater Technol. Univ. Warwick, J European Cermamic Society (1993), 11(3), p. 237–39.

*Primary Examiner*—Paul Marcantoni
*Attorney, Agent, or Firm*—Staas & Halsey LLP

[57] ABSTRACT

A method for producing a reaction sintered ceramic, including forming a green sheet by mixing an Si powder and an oxide including Al and O. A ceramic fiber can be added to the green sheet. The green sheet is reaction sintered and oxidized to yield a ceramic of high toughness and low thermal conductivity.

11 Claims, 7 Drawing Sheets

U.S. PATENT DOCUMENTS

| | | | |
|---|---|---|---|
| 4,946,807 | 8/1990 | Okuno et al. | 501/92 |
| 5,023,216 | 6/1991 | Anseau et al. | 501/103 |
| 5,071,797 | 12/1991 | Hida et al. | 501/87 |
| 5,112,780 | 5/1992 | Goto et al. | 501/98 |
| 5,192,720 | 3/1993 | Hida et al. | 501/151 |
| 5,221,647 | 6/1993 | Hida et al. | 501/92 |
| 5,238,885 | 8/1993 | Asayama et al. | 501/92 |
| 5,352,641 | 10/1994 | Matsui et al. | 501/97.4 |
| 5,366,941 | 11/1994 | Takahashi et al. | 501/92 |
| 5,370,716 | 12/1994 | Mehrotra et al. | 501/98 |
| 5,403,792 | 4/1995 | Kita et al. | 501/98.2 |
| 5,521,129 | 5/1996 | Loriz et al. | 501/98.3 |
| 5,616,527 | 4/1997 | Kita et al. | 501/98.1 |

FIBER

CERAMICS (BASIC PHASE) CONSIST OF SPECIFIC ELEMENTS
Si, O, N, Ti, Al

| ITEM | REINFORCED (EMBODIMENT 1) | NON-REINFORCED (COMPARISON) |
|---|---|---|
| A | 430 | 140 |
| B | 25 | 3.1 |
| C | 2.1 | 2.6 |
| D | 3.2 | 3.1 |

A: STRENGTH (MPa)
B: VALUE FOR BRAKING TOUGHNESS (MPa.m$^{1/2}$)
C: THERMAL CONDUCTIVITY (W/m.K)
D: RATE OF THERMAL EXPANSION x $10^{-6}$/° C

FIG. 3

| ITEM | AFTER HOT-PRESS PROCESSING (EMBODIMENT 2) | COMPARISON (EMBODIMENT 1) |
|---|---|---|
| A | 654 | 430 |
| B | 27 | 25 |
| C | 3.6 | 2.1 |
| D | 3.3 | 3.2 |

A: STRENGTH (MPa)
B: VALUE FOR BRAKING TOUGHNESS (MPa·m$^{1/2}$)
C: THERMAL CONDUCTIVITY (W/m·K)
D: RATE OF THERMAL EXPANSION × $10^{-6}$/°C

FIG. 4

| ITEM | REINFORCED (EMBODIMENT 3) | NON-REINFORCED (COMPARISON) |
|---|---|---|
| A | 409 | 135 |
| B | 23 | 3.0 |
| C | 2.2 | 2.6 |
| D | 3.2 | 3.0 |

A: STRENGTH (MPa)
B: VALUE FOR BRAKING TOUGHNESS (MPa·m$^{1/2}$)
C: THERMAL CONDUCTIVITY (W/m·K)
D: RATE OF THERMAL EXPANSION × $10^{-6}$/°C

FIG. 5

| ITEM | (EMBODIMENT 4) |
|---|---|
| A | 465 |
| B | 26 |
| C | 2.3 |
| D | 2.9 |

A: STRENGTH (MPa)
B: VALUE FOR BRAKING TOUGHNESS (MPa.m$^{1/2}$)
C: THERMAL CONDUCTIVITY (W/m.K)
D: RATE OF THERMAL EXPANSION x $10^{-6}$/°C

FIG. 6

| A | B | C | D | E | F | G |
|---|---|---|---|---|---|---|
| Si (85) . Al (15) | 15 | Si$_3$N$_4$, AlN | 211 | 10 | Si$_3$N$_4$, AlO$_{0.8}$N$_{0.2}$ | 321 |
| Si (80) . Al (20) | 18 | " | 232 | 12.5 | Si$_3$N$_4$, AlO$_{0.9}$N$_{0.1}$ | 335 |
| Si (80) . Fe (20) | 22 | Si$_3$N$_4$, FeN | 199 | 15 | Si$_3$N$_4$, FeO$_{0.7}$N$_{0.3}$ | 344 |
| Si (75) . Fe (25) | 17 | " | 204 | 12 | " | 373 |
| Si (85) . Zr (15) | 19 | Si$_3$N$_4$, ZrN | 216 | 10 | Si$_3$N$_4$, ZrO$_{0.9}$N$_{0.3}$ | 308 |
| Si (80) . Zr (20) | 23 | " | 219 | 8 | " | 298 |
| Si (75) . Nb (25) | 21 | Si$_3$N$_4$, NbN | 243 | 12 | Si$_3$N$_4$, NbO$_{0.9}$N$_{0.1}$ | 275 |
| Si (70) . Nb (30) | 19 | " | 175 | 9 | " | 311 |
| Si (85) . Ge (15) | 19 | Si$_3$N$_4$, GeN | 166 | 11 | Si$_3$N$_4$, GeO$_{0.8}$N$_{0.2}$ | 285 |
| Si (70) . Ge (30) | 20 | " | 189 | 11.5 | " | 199 |

A: COMPOSITION OF MATERIALS (wt%)
B: RATE OF POROSITY (AFTER NITRIDING) (%)
C: FORMATION PHASE (AFTER NITRIDING)
D: STRENGTH (AFTER NITRIDING) (MPa)
E: RATE OF POROSITY (AFTER OXIDATION) (%)
F: FORMATION PHASE (AFTER OXIDATION)
G: STRENGTH (AFTER OXIDATION) (MPa)

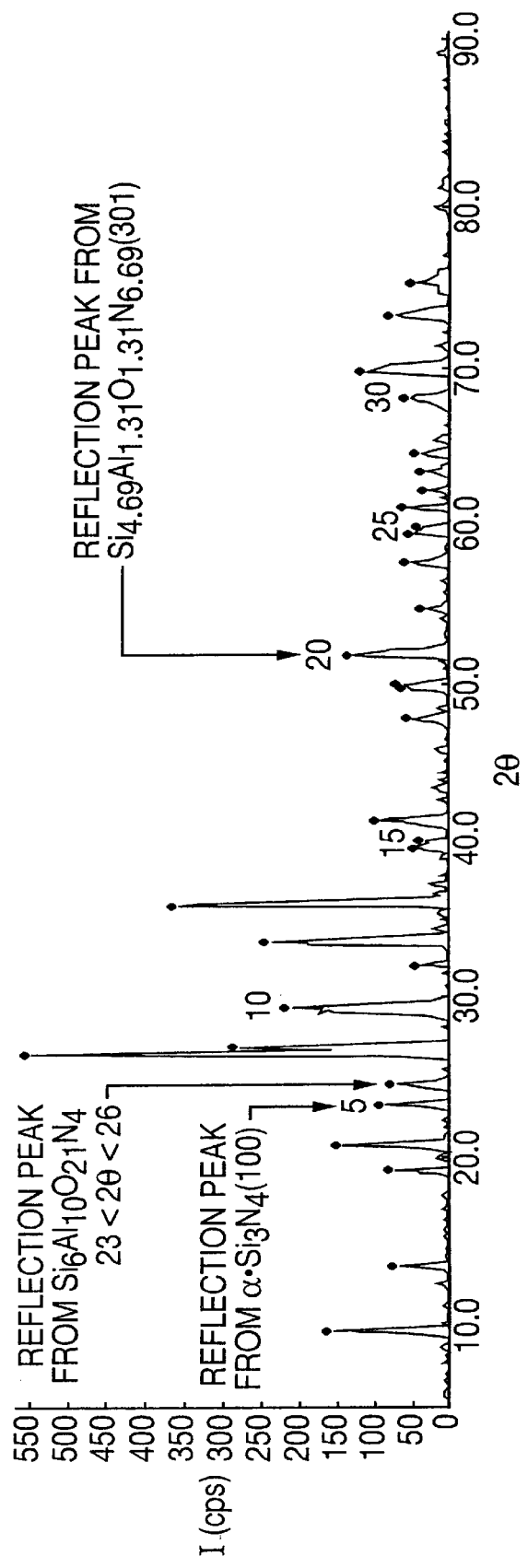

METHOD FOR PRODUCING A REACTION SINTERED CERAMIC

This is a continuation prosecution application of Ser. No. 08/787,995, filed Jan. 23, 1997, now abandoned, which is a continuation of Ser. No. 08/498,304, filed Jul. 3, 1995, now abandoned, which is a continuation of Ser. No. 08/321,776, filed Oct. 12, 1994, now abandoned.

BACKGROUND OF THE INVENTION

1. Field of the Invention

The present invention relates to a method for producing a reaction sintered ceramic improved in mechanical strength, the toughness, and thermal insulation.

2. Description of the Prior Art

Ceramics are high in the resistance to heat, shock, and wear as well as in mechanical strength and have widely been studied for use as materials of combustion chamber in internal combustion engine. As some having been marketed for practical use, the ceramics need to be high in thermal insulation or low in thermal conductivity for minimizing thermal loss of an applicable system. For use as structural materials, ceramics are required to have a minimum change in dimensions after a sintering step in the production method. To satisfy such requirements, the ceramics are commonly produced by the use of a reaction sintering process where the sintering is carried out under the atmosphere of nitrogen gas. This process allows a resultant ceramic to be small in contraction after the sintering and thus ensures a minimum change in the overall dimensions. There has been a variety of ceramics produced by the reaction sintering process and some of them will be explained below.

As disclosed in Japanese Patent Laid-open Publication 56-134568 (1981), a reaction sintered ceramic comprising a solid solution of silicon nitride ($Si_3N_4$) and having a porosity of 5% to 15% is produced by converting a powder mixture of 80% or less by volume of silicon (Si), 10% to 85% by volume of alumina ($Al_2O_3$), and 0% to 15% by volume of magnesium oxide (MgO) to a given shape, subjecting the shape to reaction sintering at 1200 to 1400° C., and heating it to 1500 to 1800° C. The resultant ceramic is increased in mechanical strength and toughness but not improved in thermal insulation.

Another ceramic having a high mechanical strength and toughness is disclosed in Japanese Patent Laid-open Publication 58-60676 (1983). For increasing its mechanical strength and toughness, ceramic of silicon nitride ($Si_3N_4$) is produced by milling, mixing, shaping, and heating for reaction sintering a mixture of 60% to 98.9% by weight of silicon, 0.1% to 15% by weight of a sintering accelerator selected from chromium (Cr), chrome oxide ($Cr_2O_3$), and chrome nitride (CrN), and 1% to 25% by weight of one or more components selected from oxide of a rare earth element, aluminum oxide, and zirconium oxide. It however fails to improve thermal insulation.

Disclosed in Japanese Patent Laid-open Publication 4-342470 (1992) is a further reaction sintered ceramic which is produced by mixing a parent material of silicon powder with nitrogen and oxygen, adding at least one element selected from titanium (Ti), zirconium (Zr), hafnium (Hf), yttrium (Y), boron (B), and aluminum (Al) to the parent material mixture, subjecting the mixture to reaction sintering under the atmosphere of nitrogen gas to form a nitride, heating the nitride in the atmosphere of oxygen gas for oxidation of a part of the nitride. The reaction sintered ceramic is increased in mechanical strength and the thermal insulation but tends to be reduced in volume after the sintering step. Hence, it will hardly be used as a member of a high precision machinery assembly.

Also, a ceramic is disclosed in Japanese Patent Laid-open Publication 1-226767 (1989), which is minimized in the dimensional change after the reaction sintering by bonding ceramic particles to each other with an electrically conductive nitride substance produced from a metal powder component of the mixture and thus reducing voids between the particles. The ceramic is however low in mechanical strength and high in thermal conductivity.

Furthermore, a ceramic reinforced with a long or short fabric is provided for increasing the toughness as disclosed in Japanese Patent Laid-open Publication 61-91063 or 61-197472 (1986). Such composite ceramic fails to attenuate the volumetric contraction after the sintering and to improve the thermal insulation.

It is an object of the present invention to eliminate the foregoing drawbacks of the prior art and particularly, to provide an improved method for producing a reaction sintered ceramic where:

(1) the mechanical strength or toughness is increased, (2) the thermal conductivity is minimized thus increasing the thermal insulation, and (3) the volumetric contraction after sintering is minimized to ensure a dimensional accuracy.

SUMMARY OF THE INVENTION

For achievement of the foregoing object, a reaction sintered ceramic according to the present invention comprises a compound of Si, O, N, and at least a specific element selected from Al, Ti, Mg, Li, Fe, Zr, Nb, and Ge.

The reaction sintered ceramic of the present invention may further comprise a fiber which contains Si.

The compound of the reaction sintered ceramic comprises $Si_3N_4$ and at least one of $FeO_{(1-x)}N_x$, $AlO_{(1-x)}N_x$, $ZrO_{(1-x)}N_x$, and $NbO_{(1-x)}N_x$ (where $0 \leq x < 1$).

Also, the compound of the reaction sintered ceramic may contain a solid solution of $Si_xAl_yO_zN_w$ and an oxide of at least one element selected from Y, La, Ce, and Dy.

As described, a parent material combination of Si and a specific oxide substance in the ceramic providing a lower thermal conductivity is reinforced with a fiber for increasing toughness. Accordingly, the resultant reaction sintered ceramic has a high toughness and a low thermal conductivity.

In particular, the oxidation of inherent nitrides except $Si_3N_4$ which serves as a basic phase, causes the over-all volume to increase and the size of voids to be reduced. As the result, the ceramic has a porosity proportion of less than 15% thus increasing the mechanical strength and is minimized in the volumetric contraction after the sintering process.

As the compound in the ceramic contains a solid solution of $Si_xAl_yO_zN_w$ ($x \geq 4.69$) and an oxide of at least one element selected from Y, La, Ce, and Dy, the toughness is further increased with the porosity proportion of less than 15% and the thermal conductivity is considerably decreased.

BRIEF DESCRIPTION OF THE DRAWINGS

FIG. 3 illustrates a comparison between the first example and a second example of the ceramic;

FIG. 4 is a table showing the characteristics of a third example of the ceramic;

FIG. 5 is a table showing the characteristics of a fourth example of the ceramic;

FIG. 6 is a table showing the characteristics of a fifth example of the ceramic after nitridation and oxidation;

FIG. 13 is a diagram showing a result of the X-ray diffraction on the sixth example of the ceramic.

DESCRIPTION OF THE PREFERRED EMBODIMENTS

The preferred embodiment of the present invention will be described referring to the accompanying drawings.

Embodiment 1

A first embodiment of the method for producing the fiber reinforced reaction sintered ceramic according to the present invention will be explained.

A powder of Si having an average particle diameter of 3 micrometers is mixed with $Al_6Si_2O_{13}$ to a weight ratio of 65:35. Then, distilled water of about 1.5 times the amount is added to the mixture and commingled for 30 hours in a ball mill. After being dried, the mixture is mixed with an organic binder in a pressure kneader to form a green composition. The green composition is high in fluidability and can thus flow into tiny voids under a small pressure.

A sheet, 5×5 cm, of SiC fabric provided in the form a two-dimensional texture is placed in a set of dies and coated with a uniform layer of the green composition. This process is repeated multiple times to form a 20-layer green structure of about 3 cm in thickness. The structure is pressed down between the dies by a force of 1000 kgf/cm2 and after being removed from the dies, heated to 550° C. under the atmosphere of $N_2$ gas for degreasing. Then, the SiC structure is subjected to a reaction sintering process at 1400° C. under the atmosphere of $N_2$ gas at 0.93 Mpa and heated again to 1000° C. under an oxidation atmosphere.

Figures 1, 2:
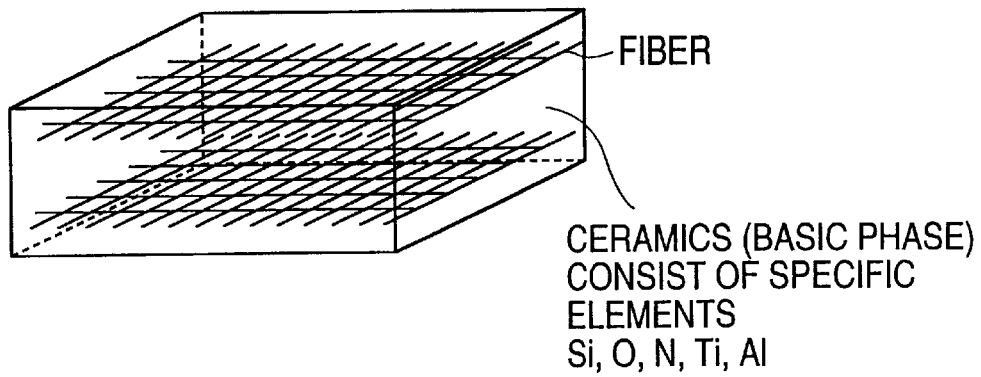
FIG. 1 is a schematic view of a first example of a ceramic according to the present invention.
FIG. 2 is a table showing the characteristics of the first example of the ceramic.

FIG. 1 is a schematic structural view of the reaction sintered ceramic produced by the foregoing steps and FIG. 2 shows the characteristics of the ceramic. Apparently, the fiber-reinforced ceramic of Example 1 is remarkably increased in mechanical strength and toughness as compared with any conventional not-reinforced ceramic, while both the thermal conductivity and thermal expansively remain rather low. It is also found through a series of EPMA analysis actions that the phase containing Al is discontinuous or dispersed in the fiber-reinforced ceramic.

Embodiment 2

The green composition produced in Embodiment 1 is sized and placed in a set of black carbon dies. Then, it is subjected to a hotpress process where it is heated to 1450° C. under a pressure of 20 Mpa in the atmosphere of nitrogen gas to have a higher density structure of the ceramic.

FIG. 3 shows a comparison between the hotpress processed ceramic and the ceramic of Embodiment 1. As apparent, the hotpress processed ceramic is slightly higher and unfavorable in thermal conductivity but much increased in mechanical strength.

Embodiment 3

A powder of Si having an average particle diameter of 3 micrometers is mixed with $Al_2TiO_5$ to a weight ratio of 65:35. Then, distilled water of about 1.5 times the amount is added to the mixture and commingled for about 20 hours. After being dried, the mixture is mixed with an organic binder in a pressure kneader to form a green composition.

A sheet, 5×5 cm, of fabric comprising Si, Ti, O, and N and provided in the form of a two-dimensional texture is placed in a set of dies and coated with a uniform layer of the green composition. This process is repeated multiple times to form a 20-layer green structure of about 3 cm in thickness.

The 20-layer green structure is pressed down between the dies by a force of 1000 kgf/cm2 and after being removed from the dies, heated to 550° C. under the atmosphere of $N_2$ gas for degreasing. Then, the green structure is subjected to a reaction sintering process at 1400° C. under the atmosphere of $N_2$ gas at 0.93 Mpa and heated again to 1000° C. under an oxidation atmosphere.

FIG. 4 illustrates the characteristics of the fiber-reinforced ceramic produced by the above steps. Apparently, the fiber-reinforced ceramic of Embodiment 3 is remarkably increased in mechanical strength and toughness as compared with any conventional not-reinforced ceramic, while both the thermal conductivity and the thermal expansively remain rather low. It is also found through a series of EPMA analysis actions that both Al and Ti are dispersed in the phase including Si and that the phase containing Al is surrounded by the phase containing Ti forming a separate phase.

Embodiment 4

A powder of Si having an average particle diameter of 3 micrometers is mixed with a non-crystalline form of $Si_3N_4$ and $Al_6Si_2O_{13}$; to a weight ratio of 45:20:35 respectively. Then, distilled water of about 1.5 times the amount is added to the mixture and commingled for about 20 hours in a ball mill. After being dried, the mixture is mixed with an organic binder in a pressure kneader to form a green composition.

By carrying out the same steps as of Embodiments 1, 2, and 3, green composition is converted to the reaction sintered ceramic. The characteristics of the ceramic of Embodiment 4 are improved as shown in FIG. 5, where thermal conductivity is considerably decreased since the addition of the non-crystalline substance encourages phonon dispersion, thus enhancing thermal insulation. It is also found through a series of EPMA analysis actions that the phase containing largely Si and O is surrounded by the phase including Si, Al, O, and N forming a separate phase.

Embodiment 5

A powder of metal silicon (Si) is mixed with 20% to 40% by weight of each of Al, Fe, Zr, Nb, and Ce in powder form. A binder is added to each the resultant mixture of ten different combinations. The mixture is then dried, milled, and formed by CIP process to a square rod shape of 15×10×40 mm. Accordingly, 10 test pieces are prepared.

The ten test pieces are heated to 1400° C. under the atmosphere of nitrogen gas at 0.93 MPa, producing types of the nitride, $Si_3N_4$—AlN, $Si_3N_4$—FEN, $Si_3N_4$—ZrN, $Si_3N_4$—NbN, and $Si_3N_4$—GeN. The test pieces are further heated at 1000° C. under the common atmosphere for oxidation of the nitrides excluding $Si_3N_4$. As the result, the reaction sintered ceramic is produced comprising $Si_3N_4$ crystal with an average particle diameter of less than 3 micrometers in a parent phase and one or more of compounds selected from $FeO_{(1-x)}N_x$; $AlO_{(1-x)}N_x$, and $NbO_{(1-x)}N_x$ where $0 \leq x < 1$. It has a porosity proportion of less than 15%.

FIG. 6 represents a table showing the porosity, mechanical strength, and phase of the ten different combinations of the reaction sintered ceramic of Example 5 after the sintering (nitridation) step and the oxidation step. As apparent, the oxidation of nitride is selectively executed except $Si_3N_4$ and causes the overall volume of the ceramic to increase thus to reducing the size of voids. Accordingly, the proportion of voids is decreased to less than 15% and the mechanical strength will thus be increased.

Figure 7:
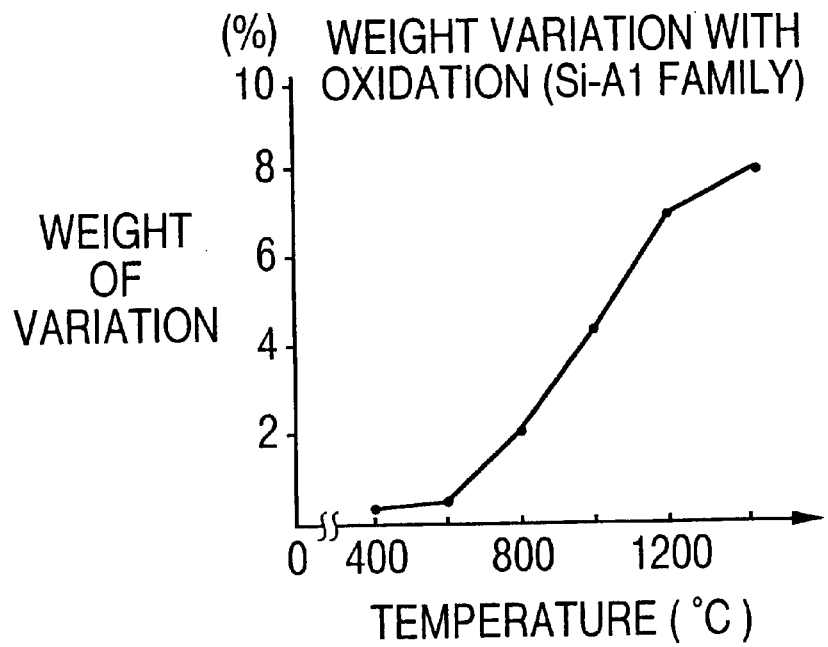
FIG. 7 is a graphic diagram showing the relation between the sintering temperature and a change in the weight after oxidation of the fifth example of the ceramic.
Figure 8:
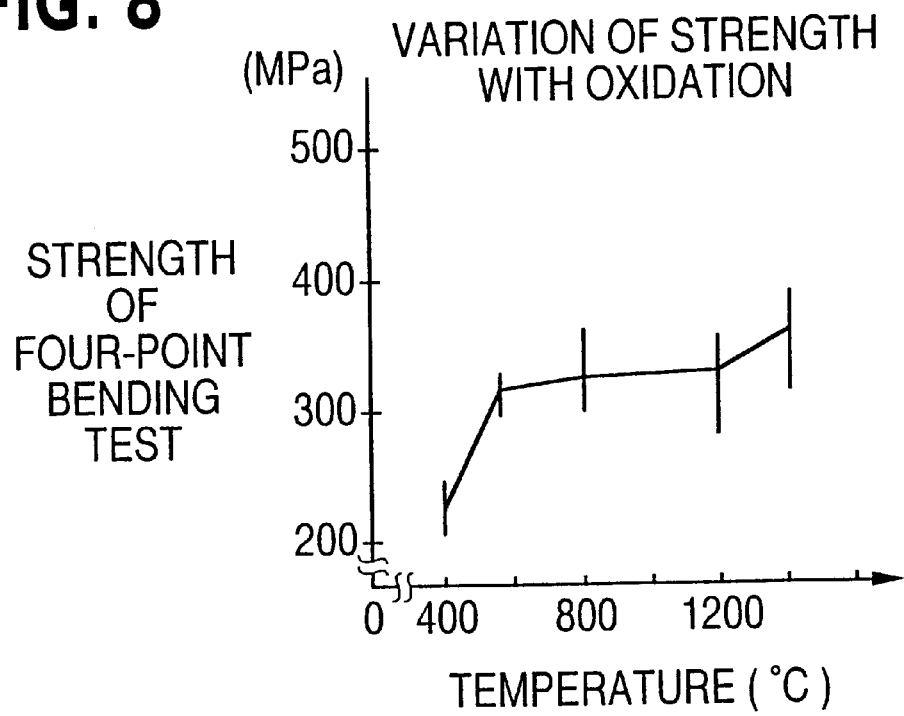
FIG. 8 is a graphic diagram showing the relation between the sintering temperature and a change in the mechanical strength after oxidation of the fifth example of the ceramic.

FIGS. 7 and 8 illustrate changes in the weight and the mechanical strength respectively of the oxidized test piece in proportion to an increase of the heating temperature. It is clear that the higher the temperature rises, the more the weight and the strength are increased. It is also found that the test pieces produced by forming by the same dies to a shape and subjected to sintering and oxidation are very small in the dimensional difference as their standard deviation is as low as 0.005 to 0.006 mm.

Embodiment 6

A green composition is produced by a powder mixture of 20% to 50% by weight of silicon and 20% to 49% by weight of $Al_6Si_2O_{13}$ or $2MgO-2Al_2O_3-5SiO_2$, and an oxide (e.g. $Y_2O_3$) of an element selected from yttrium (Y), lanthanum (L), cerium (Ce), and dysprosium (Dy). The green composition is subjected to a reaction sintering process at 1450° C. under the atmosphere of nitrogen gas and then, heated to 1700° C., forming the reaction sintered ceramic containing a solid solution of $Si_xAl_yO_zN_w$.

The ceramic of Embodiment 6 has a porosity proportion of 5% to 15% and x of its component $Si_x$ in the solid solution is 4.69 or higher. The value x is set to as high as 4.69 for increasing mechanical strength and decreasing thermal conductivity simultaneously.

FIGS. 9 to 12 are graphic diagrams showing the relation between the property of the ceramic and the sintering temperature when the amount of yttrium oxide is varied in the powder mixture which comprises Si, $Al_6Si_2O_{13}$, $Y_2O_3$, and beta-SiN. FIG. 13 illustrates a resultant spectrum of the X-ray diffraction of the ceramic of Embodiment 6.

Figure 9:
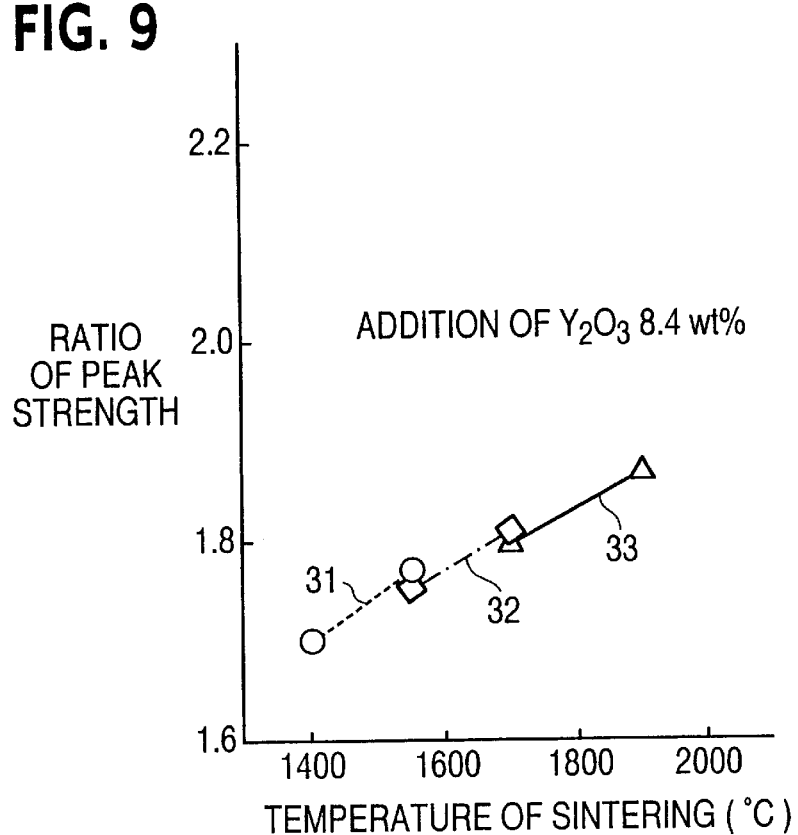
FIG. 9 is a graphic diagram showing the relation between the sintering temperature and a peak intensity ratio of X-ray diffraction at the 100th face of alpha silicon nitride in a sixth example of the ceramic.

FIG. 9 shows the relation between the sintering temperature and the peak intensity ratio of X-ray diffraction at the 100th face of alpha silicon nitride. As shown, the line 31 represents diffraction data on the 110th face of $Si_{1.8}Al_{0.2}O_{1.2}N_{1.8}$ containing 8.4% by weight of $Y_2O_3$, the line 32 represents data on the 301th face of $Si_{4.69}Al_{11.31}O_{1.31}N_{6.69}$, and the line 33 is data at 2h=23–26° of $Si_6Al_{10}O_{21}N_4$.

Figure 10:
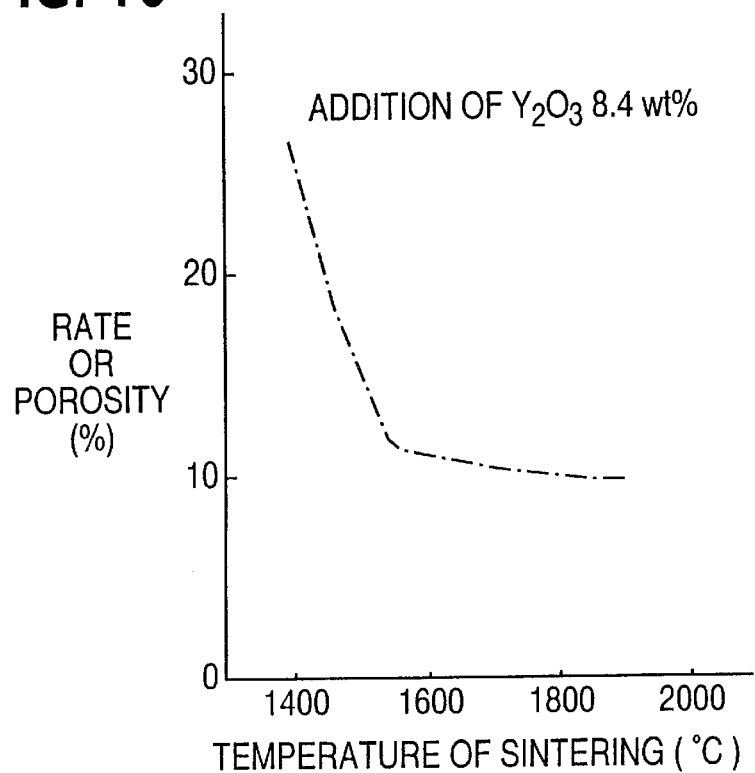
FIG. 10 is a graphic diagram showing the relation between the sintering temperature and the porosity of the sixth example of the ceramic.

FIG. 10 shows the relation between the sintering temperature and the porosity of the reaction sintered ceramic containing 8.4% by weight of $Y2O_3$. It is apparent that the higher the temperature, the lower the porosity decreases. This is explained by the fact that the shift from $Si_{1.8}Al_{0.2}O_{1.2}N_{1.8}$ to $Si_6Al_{10}O_{21}N_4$ with an increase of the sintering temperature causes volumetric expansion and reduces the size of voids as apparent from FIG. 9.

Figure 11:
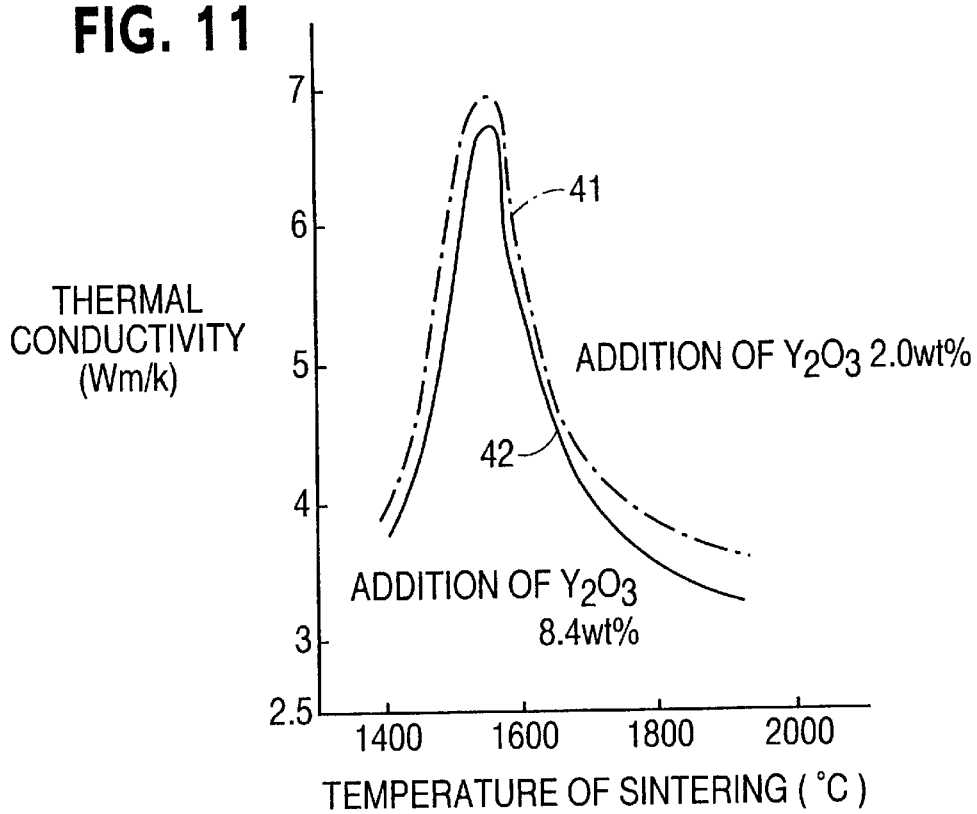
FIG. 11 is a graphic diagram showing the relation between the sintering temperature and the thermal conductivity of the sixth example of the ceramic.

FIG. 11 illustrates the relation between the sintering temperature and the thermal conductivity of the ceramic. As shown, the curve 41 represents when 2.0% by weight of $Y_2O_3$ is contained in the ceramic and the curve 42 represents when $Y_2O_3$ is 8.4% by weight. It is clear that the thermal conductivity increases in proportion to the sintering temperature, reaches a maximum at about 1550° C., and then, decreases gradually. The increase of the thermal conductivity until the temperature rises to 1550° C. results from declination in the porosity. The decrease after the maximum is explained by the fact that the composition of the solid solution is changed in random and lost in the consistency.

Figure 12:
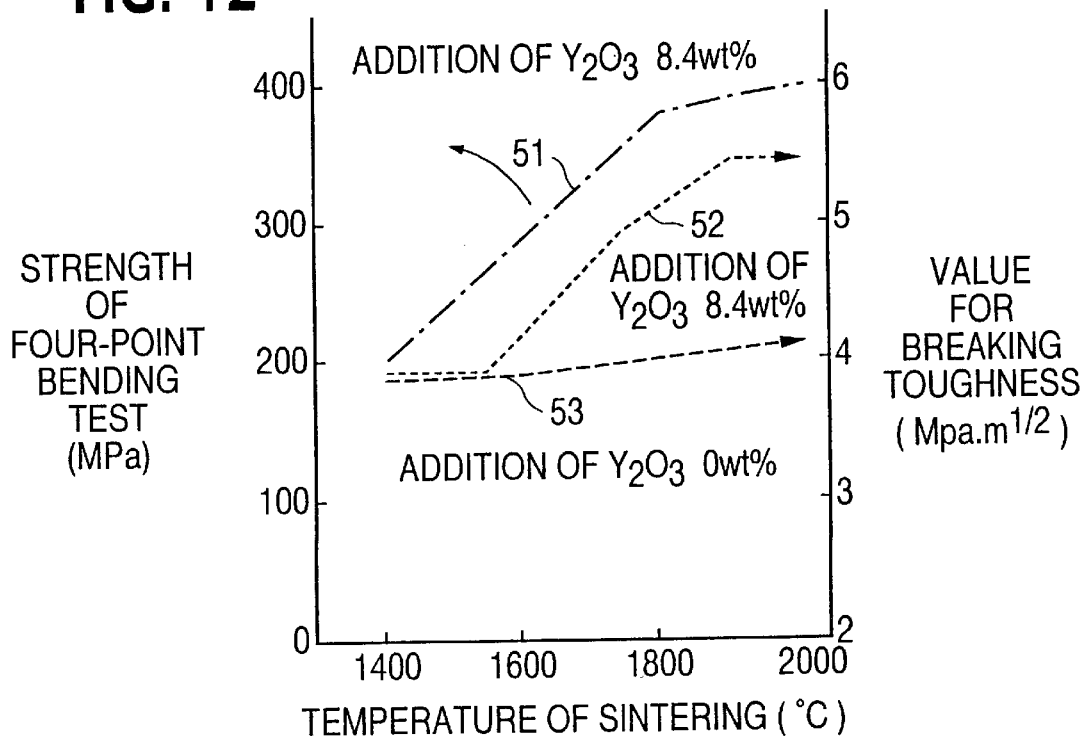
FIG. 12 is a graphic diagram showing the relation between the sintering temperature and the mechanical strength of the sixth example of the ceramic.

FIG. 12 shows the relation between sintering temperature and mechanical strength and toughness to bending stress of the ceramic. As shown, the curve 51 represents a strength with 8.4% by weight of $Y_2O_3$, the curve 52 is a toughness with 2.0% by weight of $Y_2O_3$, and the curve 53 represents when no $Y_2O_3$ is used. It is clear that the strength and toughness is increased in proportion to the sintering temperature and that its increase is encouraged by the presence of $Y_2O_3$. However, if $Y_2O_3$ exceeds 15% by weight, the ceramic produces a crack upon being heated to 1000° C. in the atmosphere. This may result from an unfavorable amount of alpha silicon nitrogen.

It is understood that the present invention is not limited to the foregoing examples and various changes and modifications will be possible without departing from the scope of the invention.

What is claimed is:

1. A method for making one of a SIALON and $Si_3N_4$ reaction sintered ceramic, comprising the steps of:

forming a green composition from a mixture of about 20–65 weight % of a powder of Si and about 35–49 weight % of an oxide including Al and O;

reaction sintering said green composition at about 1400° C. to 1450° C. in an atmosphere of nitrogen gas;

heating at a temperature range of about 1000° C. to 1700° C. while oxidizing said sintered composition in an oxidation atmosphere to a nitride phase having a porosity of 15% or less.

2. The method of claim 1, wherein said forming step includes the step of adding a ceramic fiber to said green composition.

3. The method of claim 2, further comprising the step of selecting said ceramic fiber as SiC.

4. The method of claim 1, further comprising the step of selecting said oxide to include one of Si, Ti, and Mg.

5. The method as recited in claim 1, further comprising the step of adding $Y_2O_3$ to form the green composition.

6. A method for making one of a SIALON and $Si_3N_4$ reaction sintered ceramic, comprising the steps of:

forming a green composition from a mixture of about 20–65 weight % of a powder of Si and about 35–49 weight % of an oxide including Al and O;

coating a ceramic fiber with the green composition;

reaction sintering said green composition and ceramic fiber at about 1400° C. to 1450° C. in an atmosphere of nitrogen gas; and heating at a temperature range of about 1000° C. to 1700° C. while oxidizing said sintered composition in an oxidation atmosphere to a nitride phase having a porosity of 15% or less.

7. The method of claim 6, further comprising the step of selecting said ceramic fiber as SiC.

8. The method of claim 6, further comprising the step of selecting said oxide to include at least one of Si, Ti, and Mg.

9. The method as recited in claim 6, further comprising the step of adding $Y_2O_3$ to form the green composition.

10. A method for making one a SIALON and $Si_3N_4$ reaction sintered ceramic, consisting the steps of:

forming a green composition from a mixture of about 20–65 weight % of a powder of Si and about 30–49 weight % of an oxide including Al and O;

reaction sintering said green composition at about 1400° C. to 1450° C. in an atmosphere of nitrogen gas;

heating at a temperature range of about 1000° C. to 1700° C. while oxidizing said sintered composition in an oxidation atmosphere to a nitride phase having a porosity of 15% or less.

11. A method for making one of a SIALON and $Si_3N_4$ reaction sintered ceramic, consisting the steps of:

forming a green composition from a mixture of about 20–65 weight % of a powder of Si and about 35–49 weight % of an oxide including Al and O;

coating a ceramic fiber with the green composition;

reaction sintering said green composition and ceramic fiber at about 1400° C. to 1450° C. in an atmosphere of nitrogen gas; and heating at a temperature range of about 1000° C. to 1700° C. while oxidizing said sintered composition in an oxidation atmosphere to a nitride phase having a porosity of 15% or less.

* * * * *

UNITED STATES PATENT AND TRADEMARK OFFICE
CERTIFICATE OF CORRECTION

PATENT NO.:      6,040,256
DATED      :     March 21, 2000
INVENTOR(S):     Hideki KITA It is certified that errors appear in the above-identified patent and that said Letters Patent is hereby corrected as shown below:

Col. 5
    line 10, change "FEN" to --FeN--.

Col. 6
    line 5, change "Y20$_3$" to --Y$_2$0$_3$--.

Signed and Sealed this

Twenty-ninth Day of May, 2001

Attest:

NICHOLAS P. GODICI

*Attesting Officer*    *Acting Director of the United States Patent and Trademark Office*